Patented Sept. 25, 1951

2,569,132

UNITED STATES PATENT OFFICE 2,569,132

METHOD FOR PRODUCTION OF TRIKETONES

Donald S. Melstrom and Roy T. Holm, Berkeley, Calif., assignors to Shell Development Company, San Francisco, Calif., a corporation of Delaware No Drawing. Application June 22, 1948, Serial No. 34,557

9 Claims. (Cl. 260—590)

This invention relates to a process for the production of triketones and their derivatives by reacting a ketene compound with a beta-diketone, the invention being particularly directed to a method for increasing the efficiency of said reaction.

Prior investigators have until recently taught the general failure of ketenes to react or condense with ketones, and the reported failure of the ketene produced on pyrolysis of acetone to react with unconverted acetone has frequently been cited to illustrate this non-reactivity. In fact, the reported inertness of ketones toward the various ketenes has been made the basis of a process for the separation of ketene itself from the other condensable by-products formed on pyrolysis of acetone. While it is now known that such compounds will inter-react, the available reaction methods are of restricted application and do not provide the high product yield requisite for commercial operation.

It is accordingly an object of the present invention to provide an improved process for reacting ketenes with ketones, a more particular object being to achieve the efficient production of triketones by reacting ketenes with beta-diketones. Other objects of the invention will become apparent as the description proceeds.

It is our discovery that triketones of any desired structural configuration may be produced in relatively high yield by reacting a beta-diketone with a ketene in the presence of free radicals.

The term "beta-diketones," as employed herein, is intended to embrace the various organic compounds having two carbonyl groups separated by a single carbon atom which, in turn, is attached to at least one hydrogen atom. These compounds may be represented by the general formula:

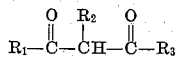

wherein $R_1$ and $R_3$, which may be the same or different, may represent alkyl, aralkyl, alkaryl, aryl or cycloparaffinic radicals, which radicals may contain substituent atoms or radicals such as halogen atoms which do not interfere with the desired reaction, and $R_2$ may represent either the hydrogen atom or any radical of the type designated by $R_1$ or $R_3$. In many cases any two of the radicals $R_1$, $R_2$ and $R_3$ may form parts of a common nucleus in a cyclic compound, in which case one or both of the carbonyl carbon atoms will also form a part of such nucleus.

Suitable alkyl groups which $R_1$, $R_2$ and $R_3$ may represent are the methyl, ethyl, n-propyl isopropyl, the butyl and the amyl radicals; suitable aralkyl radicals are the benzyl, methyl benzyl, phenyl ethyl, phenyl propyl, and naphthyl methyl radicals; suitable alkaryl radicals are the methyl phenyl, ethyl phenyl, propyl phenyl, methyl naphthyl, and ethyl naphthyl radicals; suitable aryl radicals are the phenyl and naphthyl radicals; and suitable representative cycloparaffinic radicals are the cyclopentyl, methyl cyclopentyl, dimethyl cyclopentyl, ethyl cyclopentyl, cyclohexyl, methyl cyclohexyl, polymethylcyclohexyl, and propyl cyclohexyl radicals. Representative halogen-substituted hydrocarbon radicals which $R_1$, $R_2$ and $R_3$ may represent are the chlormethyl, dichloromethyl, chloroethyl, bromomethyl, bromoethyl, chloropropyl, chlorbutyl, iodoethyl, fluoromethyl, chlorobenzyl, chlorophenyl, dichlorophenyl, chloronaphthyl, chlorocyclopentyl, bromocyclopentyl, chlorocyclohexyl, chloromethylcyclopentyl, and bromoethylcyclohexyl radicals. It is preferred to employ beta-diketones of the type wherein $R_2$ is the hydrogen atom, and illustrative compounds of this preferred type include acetylacetone, propionylacetone, butyrylacetone, isobutyrylacetone, caproylacetone, valenrylacetone, isovaleryacetone, pivalylacetone, caprylylacetone, caprylacetone, lauroylacetone, myristoylacetone, oleylacetone, palmitoylacetone, stearoylacetone, 3,5-heptanedione, 3,5-octanedione, 4,6-nonanedione, 3,5-nonanedione, 3,5-decanedione, 4,6-decanedione, 3-methyl-5,7-hendecanedione, benzoylacetone, paratoluylacetone, anisoylacetone, cumoylacetone, parachlorobenzoylacetone, alpha-acetylcyclohexanone, and their homologues and analogues. Further types of preferred beta-diketones are those wherein the carbon atoms of both carbonyl groups are connected in the nucleus of a cyclic compound, such as cyclopenta-1,3-dione and cyclohexa-1,3-dione, or where the carbon atom of only one of the carbonyl groups is connected in such a nucleus, such as alpha-acetylcyclohexanone and alpha-acetylcyclopentanone. With respect to such cyclic beta-diketones, we prefer to employ compounds which have six carbon atoms in the ring, but compounds which have 4 or 5 carbon atoms in the ring are generally applicable as well.

The ketenes are a special class of ketones which undergo many reactions that are non-analogous to those of the general class of carbonyl compounds, which reactions are due to the presence of the structural arrangement >C=C=O in the ketene molecule. They may be represented by the general formula

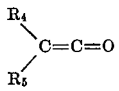

wherein the expressions R₄ and R₅, which may be the same or different, represent members selected from the group consisting of the hydrogen atom and the alkyl, aryl, aralkyl, alkaryl and cycloparaffinic radicals. When both R₄ and R₅ are hydrogen the compound is ketene itself, CH₂=C=O, whereas when only R₄ is hydrogen the compound is classified as an aldoketene, and when neither R₄ or R₅ is hydrogen, as a ketoketene. While the invention will be generally described and illustrated hereinafter with particular reference to ketene itself, since this compound is the preferred reactant of its class, nevertheless other ketenes, including, for example, both the aldoketenes and ketoketenes, may be employed provided the structural arrangement >C=C=O contains the only aliphatic multiple linkage in the compound. Illustrative examples of particular ketenes suitable for employment in the present invention include, ketene, methylketene, methylbutylketene, ethylisopropylketene, amylketene, diheptylketene, ethylcyclohexyl ketoketene, bis(trimethylcyclohexyl)ketene, phenylcyclohexyl ketoketene, dimethylphenyl aldoketene and decylphenyl ketoketene.

The term "free radical" is defined herein as any complex of abnormal valency which possesses additive properties but does not carry an electrical charge and is not an ion, this being substantially the definition given in the text, "The Chemistry of Free Radicals," by W. A. Waters, published in 1946 by the Oxford University Press. Representative compounds which are dissociated into free radicals on exposure to heat or actinic light, and which may usefully be employed in the practice in the present invention, are the organic peroxides, the metallo-alkyl compounds such as tetra ethyl lead, the diazo compounds, and "the positive halogen compounds" described by Robertson and Watson, Journ. Chem. Soc., April 1947, page 492, which include N-chloroamides such as N-2,4-trichlorobenzonitrile, chloropicrin and the like. The organic peroxides form a preferred source of free radicals for use in the present invention since they are activated over a wide range of elevated temperatures, and their employment allows a close control of the reaction and does not require specialized apparatus. Representative organic peroxides, any one or more of which may be employed in carrying out this invention, are: diethyl percarbonate; allyl percarbonate; benzoyl peroxide; acetyl peroxide; betachlorobenzoyl peroxide; methyl n-amyl ketone peroxide; methyl isobutyl ketone peroxide; methyl n-propyl ketone peroxide; methyl ethyl ketone peroxide; acetone peroxide; ethyl peroxide; di-tertiary butyl peroxide; methyl isobutyl peroxide; and dicyclohexyl peroxide. These and other peroxides are described in U. S. Patent No. 2,379,218 and reference is hereby made to said patent for a more complete description of said peroxides and the manner of their use to form free radicals.

The process of this invention may be illustrated by the following general equation:

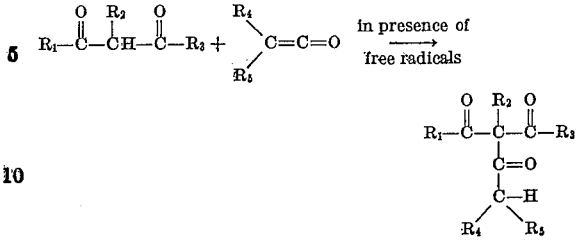

In this equation the radicals R₁, R₂, R₃, R₄ and R₅ are the same as indicated in preceding paragraphs. It will be observed that the product of the foregoing equation is characterized by the presence of three carbonyl groups the carbon atoms of which are attached to the same carbon atom, and products of this character are therefore referred to herein as "triketones."

The method of this invention is conducted by bringing the ketene into reactive engagement with the beta-diketone in the presence of free radicals, and in either the presence or absence of an inert solvent or diluent. Preferably, however, the beta-diketone reactant and the peroxide or other free radical source are dissolved in benzene, toluene, acetone or other appropriate inert solvent, and the resulting solution is then brought to the desired operating temperature, after which the ketene is added to the solution, preferably in the gaseous form. This operating temperature will vary from one case to another depending on the nature of the reactants as well as upon the peroxide chosen, and optimum conditions for any given reaction system can only be determined by actual experiments. However, good results are universally obtained by operating within the range of 30 to 150° C., and a preferred range is from 50 to 100° C. The use of any temperature within these ranges will thermally decompose organic peroxides to free radicals, though optimum free radical decomposition temperatures vary from one peroxide to another.

As stated above, ketene itself is the preferred reactant of the general ketene class for use in carrying out the foregoing reaction. However, other ketenes can also be used with good results, examples thereof being aldoketenes as methylketene, ethylketene and phenylketene, and such ketoketenes as dimethylketene, diethylketene, methylethylketene, phenylmethylketene and diphenylketene. While the respective ketene and beta-diketone reactants theoretically combine in equi-molar proportions, it is nevertheless preferable to employ an excess of the ketene, as, for example, from one to four moles of a ketene for each mole of the beta-diketone. Since ketene itself, as well as various others of the ketene reactants are gases at room temperatures and above, the normal practice is to add the ketene to the beta-diketone. The rate of ketene addition is not critical and may be varied over wide limits; however, it is satisfactory in most instances to add the ketene at a rate of from about 0.1 to 1 mole per hour, per mole of beta-diketone present.

The amount of free radical generating catalyst incorporated in the reaction mixture may be varied over a relatively wide range while still obtaining a uniformly high yield of triketone. Thus, excellent results are obtained by using from 0.1 to 1 mole percent of catalyst, particularly in the case of organic peroxides, this percentage being based on the total number of moles of reactants present. Use of the catalyst in any amount materially improves the yield of triketone as compared with the yield obtainable in the absence of the catalytic ingredient, and in many cases the catalyst is effective to bring about the desired reaction where otherwise no reaction at all would take place, or at least substantially none. Particular information as to the benefits obtainable by using a free radical generating catalyst is given in the examples to follow.

The reaction may be stopped at any point, but the recommended procedure is to continue the same until the maximum yield of product has been obtained. Inasmuch as the triketones are relatively stable compounds which are but little affected by the reaction conditions normally prevailing in the system, the reaction period may be extended in any desired amount without harmful result. Once the reaction is complete, or if the process is earlier discontinued, the triketone product may be recovered from the reaction mixture in any convenient manner, though the preferred method is to separate the various components of the reaction mixture by fractional distillation.

The following examples illustrate the invention in various of its embodiments. In these examples "percent conversion" is equal to $$\frac{\text{Moles of triketone produced}}{\text{Moles of beta-diketone charged}} \times 100$$

and "percent yield" is equal to $$\frac{\text{Moles of triketone produced}}{\text{Moles of beta-diketone consumed}} \times 100$$

Example I

Diacetylisovalerylmethane, a triketone, was produced by reacting ketene and acetylisovalerylmethane in both the presence and absence of a benzoyl peroxide catalyst. In the non-catalytic run, 1.14 moles of ketene gas, produced by the pyrolysis of acetone, was passed at the rate of 0.5 to 0.57 mole per hour into 1 mole of acetylisovalerylmethane dissolved in 150 grams of benzene maintained at a temperature of about 30 to 33° C. The conversion to diacetylisovalerylmethane was 23% and the yield 85%. The next operation was conducted under the same conditions except that here 0.5 gram of benzoyl peroxide was added to the benzene solution, and the latter was maintained at a temperature between 30 and 43° C. Here the conversion to diacetylisovalerylmethane was 76% and the yield 92.6%.

In each case, the diacetylisovalerylmethane, identified by infra-red absorption data, was recovered as a distillate boiling at 111° C. (10 mm. Hg) and having a refractive index $n_D^{20}$ of 1.4762. Chemical analysis gave the following results:

|  | Carbon | Hydrogen |
|---|---|---|
| Calculated | 65.19 | 8.75 |
| Experimental | 65.01 and 65.06 | 8.76 and 8.78 |

The copper derivative of diacetylisovalerylmethane was prepared by reacting this triketone compound with copper acetate in an aqueous alcoholic solution in the ratio of 2 moles of the triketone to one mole of the copper salt. The resulting crystallized copper derivative was light blue in color, and melted at from 98 to 101° C. Both the triketone and its copper derivative are extremely useful as fungicides and insecticides, the copper derivative having been successfully employed, for example, in the fumigation of seeds.

Example II

This operation was also directed to the production of diacetylisovalerylmethane. Here, 1.75 moles of ketene were passed at the rate of 0.5 to 0.57 mole per hour into 0.9 mole of acetylisovalerymethane containing 1 gram of di-tertiary-butyl peroxide catalyst. The reacting mixture was maintained at a temperature of from 20 to 70° C. during the first 2 hours of the reaction, and from 70 to 61° C. during the next 1½ hours. The conversion to diacetylisovalerylmethane was 90% and the yield 93%.

Example III

Benzoyldiacetylmethane was prepared by the condensation of benzoyl acetone and ketene. In the first run, 0.75 mole of ketene was slowly passed into 0.395 mole of benzoylacetone in a benzene solvent, the solution being maintained at between 60 and 83° C. during the reaction period of approximately 1½ hours. The conversion to benzoyldiacetylmethane was 39% and the yield 68%.

In the next run 0.55 mole of ketene was slowly added to 0.136 mole of benzoylacetone in the absence of any solvent, but in the presence of 0.5 grams of benzoyl peroxide. Here the reaction temperature was maintained between 40 and 59° C., and the time of reaction was approximately one hour. The conversion to benzoyldiacetylmethane was 82% and the yield, as it happened, was also 82%.

Example IV

Benzoyldiacetylmethane is also produced in high yield by following the procedure of Example III, the second paragraph above, except that 1 gram of tetraethyl lead is substituted for benzoyl peroxide as the source of free radicals.

Example V

Para-toluyldiacetylmethane was prepared by passing 0.75 mole of ketene into 0.36 mole of p-toluylacetone dissolved in benzene and maintained at a temperature between 60 and 130° C. The conversion to the desired triketone was 53%. On the other hand, the conversion was increased to 88% when 1.5 moles of ketene were passed into 0.67 mole of p-toluylacetone in which 1 gram of benzoyl peroxide had been dissolved, the latter operation being conducted at a temperature between 46 and 55° C.

Example VI

Para-chlorobenzoyldiacetylmethane was prepared by condensing 1 mole of ketene with 0.255 mole of para-chlorobenzoylacetone dissolved, together with 1 gram of benzoyl peroxide, in benzene, the ketene being slowly added to the reacting mixture as described in Example I. The temperature was maintained at about 70° C. until the benzene was substantially removed and was then increased to 150° C. Conversion to parachlorobenzoyldiacetylmethane was 90%, the product being distilled from the reaction mixture over a temperature range of from 117 to 126° C. (at 0.5 mm. Hg); it had a refractive index $n_D^{20}$ of 1.5830.

An attempt was made to prepare the same product in the absence of any catalyst, acetone being substituted for benzene as the solvent. It appeared that no para-chlorobenzoyldiacetylmethane at all was produced under these circumstances.

*Example VII*

Diacetyloctoylmethane was prepared from ketene and n-octoylacetone in both the presence and absence of a peroxide catalyst. The non-catalytic operation was conducted by slowly passing 0.5 mole of ketene into 0.15 mole of n-octoylacetone in a benzene solvent at the rate of about 0.5 to 0.57 mole per hour, the solution being maintained at 60° C. during the reaction period. Diacetyloctoylmethane was recovered from the resulting reaction mixture in a conversion of less than 9%.

The other reaction was conducted by passing 2.3 moles of ketene, at the same rate as indicated above, into 0.3 mole of n-octoylacetone dissolved in a benzene solution containing 0.5 gram of benzoyl peroxide and maintained at from 60 to 65° C. The conversion to diacetyloctoylmethane in this case was 21%.

*Example VIII*

Acetylacetone was reacted with ketene to produce triacetylmethane. This reaction is an exception to the general rule in that it does proceed in a reasonably satisfactory manner even in the absence of a catalyst. However, even here it is possible to obtain greatly improved results through use of an organic peroxide (free radical generating) catalyst of the type disclosed herein. Thus, in an operation conducted by passing 1.14 moles of ketene at the rate of 0.5 mole per hour into 1 mole of acetylacetone maintained at 74° C., there was produced 0.63 mole of triacetylmethane (63% conversion).

By conducting the foregoing operation under exactly the same conditions, but with 0.5 gram of benzoyl peroxide being added to the acetylacetone prior to initiating the reaction, the conversion to triacetylmethane was increased to 80%.

*Example IX*

Following procedure outlined in Example VIII above, with benzoyl peroxide being used as the source of free radicals, there is produced diacetylpropionylmethane by substituting methylketene for ketene. Similarly, by substituting methylbutylketene for ketene, there is produced diacetyl-2-methylvalerylmethane.

*Example X*

Alpha,alpha-diacetylcyclohexanone was prepared by condensing 0.5 mole of alpha-acetylcyclohexanone with 1 mole of ketene, the ketene being admitted to the reaction zone at the rate of about 0.5 mole per hour. By carrying out the condensation in the presence of 1 gram of ditertiarybutyl peroxide and at a temperature between 113 and 118° C., the desired product was obtained in an amount equal to a 12% conversion. By substituting 1 gram of benzoyl peroxide as the free radical source, this conversion was increased to 24%. No product at all is obtained in the absence of such catalysts.

The product alpha,alpha-diacetylcyclohexanone was found to have a boiling point of from 90 to 97° C. at from 0.5 to 1 mm. of Hg pressure, and its refractive index $n_D^{20}$ was 1.4806.

We claim as our invention:

1. In a process wherein ketene is reacted with a beta-diketone wherein the carbon atom between the carbonyl carbon atoms is attached to at least one hydrogen atom to produce a triketone, the step comprising conducting said reaction in the presence of an organic peroxide and at a temperature sufficiently high to decompose said peroxide into free radicals.

2. The process of claim 1 wherein said organic peroxide is benzoyl peroxide the reaction is conducted at a temperature between 30 and 150° C.

3. In a process of reacting ketene and acetylacetone to produce triacetylmethane, the improvement comprising conducting said reaction in the presence of an organic peroxide and at a temperature sufficiently high to decompose said peroxide into free radicals.

4. The process of claim 3 wherein said organic peroxide is benzoyl peroxide and the reaction is conducted at a temperature between 30 and 150° C.

5. In a process of reacting ketene and acetylisovalerylmethane to produce diacetylisovalerylmethane, the improvement comprising conducting the reaction in the presence of an organic peroxide and at a temperature sufficiently high to decompose said peroxide into free radicals.

6. The process of claim 5 wherein said organic peroxide is benzoyl peroxide and the reaction is conducted at a temperature between 30 and 150° C.

7. In a process of reacting ketene and benzoyl acetone to produce benzoyldiacetylmethane, the improvement comprising conducting said reaction in the presence of an organic peroxide and at a temperature sufficiently high to decompose said peroxide into free radicals.

8. The process of claim 7 wherein said organic peroxide is benzoyl peroxide and the reaction is conducted at a temperature between 30 and 150° C.

9. In a process for the production of a triketone by reacting a ketene with a beta-diketone wherein the carbon atom between the carbonyl carbon atoms is attached to at least one hydrogen atom, the improvement which comprises conducting said reaction in the presence of an organic peroxide, and at a temperature sufficiently high to effect dissociation of said peroxide.

DONALD S. MELSTROM.
ROY T. HOLM.

REFERENCES CITED

The following references are of record in the file of this patent:

UNITED STATES PATENTS

| Number | Name | Date |
| --- | --- | --- |
| 2,363,836 | D'Alelio | Nov. 28, 1944 |
| 2,402,137 | Hanford et al. | June 18, 1946 |
| 2,417,381 | Spence et al. | Mar. 11, 1947 |
| 2,432,499 | Boese | Dec. 16, 1947 |
| 2,450,116 | Caldwell | Sept. 28, 1948 |